US006790467B2

(12) United States Patent
Kostival et al.

(10) Patent No.: US 6,790,467 B2
(45) Date of Patent: Sep. 14, 2004

(54) READY TO BAKE DOUGH WITH SHAPED, COEXTRUDED FILLING AND METHOD OF MAKING SAME

(75) Inventors: Kathleen Kostival, New Milford, CT (US); Robert E. Ross, Trumbull, CT (US); Jerry T. Yoakum, New Milford, CT (US)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 10/219,773

(22) Filed: Aug. 16, 2002

(65) Prior Publication Data

US 2003/0035876 A1 Feb. 20, 2003

Related U.S. Application Data

(63) Continuation-in-part of application No. 09/930,799, filed on Aug. 16, 2001, now abandoned.

(51) Int. Cl.[7] .............................................. A21D 10/02
(52) U.S. Cl. ........................... 426/94; 426/76; 426/128; 426/144; 426/283
(58) Field of Search ................................. 426/283, 128, 426/76, 94, 549, 144

(56) References Cited

U.S. PATENT DOCUMENTS

| 1,319,899 A | 10/1919 | Rafert |
| 1,929,358 A | 10/1933 | Keefer .......................... 107/54 |
| 1,952,698 A | 3/1934 | Willem ............................ 31/5 |
| 3,024,112 A | 3/1962 | Burgess ........................... 99/2 |
| 3,397,064 A | 8/1968 | Matz ............................. 99/90 |
| 3,765,909 A | 10/1973 | Moline ....................... 99/192 R |
| 4,215,104 A | 7/1980 | Ullman et al. ................... 424/15 |
| 4,445,835 A | 5/1984 | Wasserbach ............... 425/131.1 |
| 4,517,209 A | 5/1985 | Thornton et al. ............ 426/383 |
| 4,762,723 A | 8/1988 | Strong .......................... 426/283 |
| 4,777,057 A | 10/1988 | Sugisawa et al. ............ 426/412 |
| 4,859,473 A | 8/1989 | Arciszewski et al. ........... 426/19 |
| 4,888,192 A | 12/1989 | Ramnarine .................... 426/448 |
| 4,900,577 A | 2/1990 | Arciszewski et al. ......... 426/563 |
| 5,049,399 A | 9/1991 | Huang et al. ................... 426/87 |
| 5,171,599 A | 12/1992 | Weber ........................ 426/549 |
| 5,349,759 A | 9/1994 | Anton et al. .................... 33/524 |
| 5,419,903 A | 5/1995 | Evans et al. ................. 426/144 |
| 5,523,107 A | 6/1996 | Wallin ......................... 426/549 |
| 6,024,997 A | 2/2000 | Blaschke et al. ............ 426/144 |
| 6,280,783 B1 | 8/2001 | Blaschke et al. ............ 426/144 |

FOREIGN PATENT DOCUMENTS

| CA | 1338372 | 6/1996 |
| DE | 94 17 488 | 1/1995 |
| EP | 0 084 210 | 7/1983 |
| EP | 0 145 550 | 6/1985 |
| EP | 0 214 707 | 3/1987 |
| EP | 0 900 527 | 3/1999 |
| GB | 461263 | 2/1937 |
| WO | WO 90/01877 | 3/1990 |
| WO | WO 92/10101 | 6/1992 |
| WO | WO 97/31539 | 9/1997 |
| WO | WO 98/26666 | 6/1998 |
| WO | WO99/66802 | * 12/1999 |
| WO | WO 99/66802 | 12/1999 |
| WO | WO 01/06858 | 2/2001 |

OTHER PUBLICATIONS

Cookies for Kids, 1983, pp. 43,80.*
Pillsbury Best Cookies, 1997, pp. 228,243.*
Riddle, J.S., "Frookies to Offer Cookies to In–Store Departments," Supermarket News, 40(26):40 (1990).
Brochure from Readi–Bake International titled "Gourmet Cookies."
Copy of packaging for "Snap to Bake Cookies" manufactured by Pampas, A Division of Quality Bakers Australia Limited.
Copy of packaging for Holiday Sugar Cookies, manufactured by Pillsbury.

* cited by examiner

*Primary Examiner*—Lien Tran
(74) *Attorney, Agent, or Firm*—Winston & Strawn LLP

(57) ABSTRACT

A ready to bake dough product with a shaped filling is disclosed. The filling is sized and configured so as to minimize or avoid exposure or spilling during processing, handling, or baking. The shape of the filling is configured such that it has a shorter distance vertically than horizontally. The shape of the filling may be substantially in the form of a rectangle, triangle, pentagon, hexagon, half circle, diamond, trapezoid, oval, or similar shapes.

21 Claims, 3 Drawing Sheets

READY TO BAKE DOUGH WITH SHAPED, COEXTRUDED FILLING AND METHOD OF MAKING SAME

CROSS-REFERENCE TO RELATED APPLICATION

This application is a continuation-in-part of application Ser. No. 09/930,799, filed Aug. 16, 2001, now abandoned. The entire contents of the prior application is hereby incorporated herein by express reference thereto.

FIELD OF INVENTION

The invention is directed to a filled ready-for-use dough, which can be preserved in a refrigerator or freezer and which is typically prepared from flour, sugar, a leavening agent, a fat, water, optionally sugar, and other ingredients. The dough includes score lines thereon which facilitate breaking the dough into smaller pieces for baking into a final product, such as cookies, brownies, or muffins, with each piece containing a creamy, liquid, or solid filling of an edible material.

BACKGROUND OF THE INVENTION

Ready made cookie doughs already exist on the market. Typically, the dough is refrigerated and packaged either in a cylindrical shape or packaged in a cup. During use, the consumer uses a spoon or a knife to form the cookie in a circular shape prior to baking. This particular cookie dough preparation requires extensive manipulation of the cookie dough prior to use. If the cookie dough is packaged in the form of a block or sheet, then a forming device is needed in order to give the cookie the desired circular form. This cookie dough manipulation, however, leaves remnants of cookie dough pieces which must then be recycled and reshaped if desired.

Another conventional product is a frozen cookie dough which is in the form of individual amounts to form single cookies. The amounts are provided by forming dough balls or by cutting the dough into individual pieces. The balls or pieces are then placed adjacent each other on a tray or other support, and are then frozen. The dough pieces, being tacky before freezing, stick to adjacent pieces and freeze into a solid block. During use, the consumer thaws the block and then separates the individual pieces for baking. As the preparation before freezing is somewhat complex, an improvement on these type products is also needed.

PCT Application No. WO 01/06858 discloses a flat sheet or block of refrigerated dough which includes grooves or score lines that define pieces of dough that can be broken off and baked into individual cookies. Each piece includes a filling of a liquid, cream, or solid edible material therein to provide a compound cookie.

It is desirable in certain situations to fully contain the filling within the dough so that it remains inside the final baked cookie. The present invention now provides a method for making filled cookies, while substantially avoiding oozing or dripping of the filling during baking of the dough product.

SUMMARY OF THE INVENTION

The invention relates to a ready-for-use dough product including a filling and dough surrounding the filling, a top portion, a bottom portion, and side portions, with the filling being sized and configured to have a shape that is shorter in distance vertically from the base portion to the top portion than horizontally between the sides when viewed in cross-section. In one embodiment, the dough to filling has a ratio weight of about 50/50 to 95/5. In another embodiment, the shape of the filling is substantially in the form of a rectangle, triangle, pentagon, hexagon, half circle, diamond, trapezoid, or oval. In an additional embodiment, the vertical distance is about 5% to 90%.

In another embodiment, the dough is in a sheet or block form having a generally uniform thickness wherein the top portion has a surface that includes an imprint of grooves, score lines, or combinations thereof, that defines pieces of the dough to be broken off and baked, with the imprint extending into the thickness of the dough and each piece containing a filling which is surrounded above, below, and on two sides by dough. In some cases, it is preferred for the imprint to not extend entirely through the dough. In another embodiment, the dough product is in the form of a parallelepipedal or prismatic block having a thickness of about 0.5 to 5 cm, wherein a plurality of fillings are provided, with each filling having the recited shape and being spaced from adjacent fillings. In another embodiment, the product is in the form of a flat sheet having a thickness of about 1 cm to 3 cm and the fillings are provided as a plurality of spaced stripes in the dough.

In a preferred embodiment, the dough may be a sweet dough. In one embodiment, the dough includes flour, a leavening agent in an amount of up to about 3% by weight, optionally sugar, and a fat. In another embodiment, the product further includes pieces of chocolate, nuts, fruit, or candy inclusions in an amount of about 5% to 50% by weight of the dough, wherein the pieces are about 1 mm to 10 mm in size. In still another embodiment, the flour is present in an amount of about 10% to 60% by weight, the sugar, when used, is present in an amount of about 10% to 50% by weight, the leavening agent is present in an amount of about 0.1% to 3% by weight, the fat is present in an amount of about 5% to 33% by weight, and a texturing agent is present in an amount of up to 10% by weight and a flavoring agent is present in an amount of up to 8% by weight. In a preferred embodiment, the texturing agent includes egg or egg white present in an amount of about 0.1% to 10% by weight, the flavoring agent is present in an amount of about 0.1% to 7% by weight, the fat is a solid, semi-solid, or liquid at room temperature and of animal or plant origin, and the dough has a moisture content of about 2% to 25%.

In still more embodiments, the dough is in the form of a block having at least one of: at least two different dough layers, at least two different dough strips, at least some of the pieces have different colors, at least some of the pieces have surface decorations, or at least two different doughs swirled together. Preferably, the product is refrigerated or frozen prior to use.

In one embodiment, the dough includes a bakery dough for forming one more of: muffins, crackers, rolls, biscuits, pie crusts, breads, pizza doughs, or bagels.

The invention also relates to a method for providing a filled dough product which comprises providing a filling within a dough having a top portion, a bottom portion, and side portions, with the filling being sized and configured to have a shape that is shorter in distance vertically from the bottom portion to the top portion than horizontally between the side portions when viewed in cross-section to provide the filled dough product. In one embodiment, the filled dough product is prepared by coextruding the dough and the filling such that the dough surrounds the filling.

In another embodiment, the method further comprises coextruding the dough in the form of a parallelepipedal or prismatic block having a thickness of about 0.5 to 5 cm and providing a plurality of fillings therein, with each filling having a first desired shape and being spaced from adjacent fillings. In another embodiment, the dough block is coextruded as a pair of flat sheets having a thickness of about 1 to 3 cm and the fillings are provided as a plurality of spaced stripes which are extruded between the dough sheets.

In yet another embodiment, the dough is formulated to flow upon baking and the sheet is cut into pieces that are baked on a sheet or pan that allows the pieces to flow to form individually baked products having a second desired shape. In another embodiment, the dough is coextruded in the form of a block having at least two different dough layers, at least two different dough strips, at least some of the pieces have different colors, at least some of the pieces have surface decorations, or at least two different doughs are swirled together. In another embodiment, the filling is provided in discrete pulses, such that when the dough is cut into pieces, the fillings are contained within each piece and do not cross into adjacent pieces.

BRIEF DESCRIPTION OF THE DRAWINGS

The invention will be better understood in relation to the attached drawings illustrating preferred embodiments, wherein.

DETAILED DESCRIPTION OF THE PREFERRED EMBODIMENTS

Figure 1:
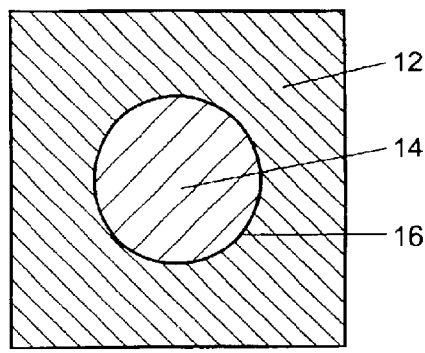
FIG. 1 shows a cross-sectional view of a prior art nozzle with a circular-shaped opening.

The invention relates to a form of pre-mixed or pre-prepared bakery dough product having a shaped filling that is ready for baking. As used herein, the term "bakery dough" refers to pre-mixed doughs of the types used for making bakery items where the dough is generally provided in the form of a sufficiently solid or semi-solid block, while the term "sweet dough" is a species thereof that refers to dough that contains at least 0.5% by weight of sugar(s), such as sucrose, fructose, glucose, lactose, or mixtures thereof, or an artificial sweetener, such as saccharine, aspartame, or polyols, such as sorbitol or maltitol. The block is typically provided under refrigerated or frozen conditions, is purchased that way by the consumer, and then is removed from the refrigerator or freezer, thawed if necessary, and then is cut or separated into pieces that are then placed onto a pan or into a baking tin for baking into the final product.

Specific examples of suitable bakery doughs include, but are not limited to, muffins (e.g., jonny cakes, English muffins), crackers (e.g., salted crackers, baked crackers, graham crackers, etc.), rolls (e.g., soft rolls, dinner rolls, crescent rolls), biscuits (e.g., buttermilk biscuits, cobbler biscuits), pie crusts, breads (e.g., focaccia, bruschetta, mixing-for-yeast breads, quick breads, sourdough breads, soda breads, breadsticks, corn bread, etc.), pizza doughs, bagels, and the like, although with increased sugar content some of these types of dough may be formed as sweet doughs. At least in the case of bagels, the dough can be boiled instead of baked. The sweet dough product would typically include a cookie dough, but may also include similar sweet dough products, such as brownies, muffins, turnovers, doughnuts, cakes, pastries, scones, muffins, and the like.

These dough products will contain a filling that is a different constituency from the dough. If the dough is individually scored, such as with a scoring wheel, knife, or ultrasonic cutter, the dough may be punctured through to the filling. This can result in loss of filling, as well as the wheel or cutter becoming contaminated with the filling. If the filling is too close to the score line, the filling may also come out of the dough when the product is separated. Since the dough may expand or settle during baking, the filling may also be exposed from the dough during the baking process, which can cause the baked product to become messy and unattractive, as well as causing the filling to burn. By carefully selecting the shape and size of the filling according to the present invention, many of these problems can be minimized.

The individual pieces of the dough product are typically broken into smaller pieces, such as into individual cookies, along score lines provided on the body and preferably the upper surface of the block. In this way, individual baked items can be made. The block may be of parallelepipedal form, cylindrical form, or prismatic form.

In one embodiment, the dough block has an imprint to facilitate breaking the dough into smaller blocks, pieces, or portions. The imprint or precut facilitates breaking the refrigerated or frozen, thawed dough prior to baking. The block of dough with an imprint can be broken into smaller blocks using a knife or by hand. When using a knife, the knife completely cuts the block of dough beyond the imprint. Alternatively, the block of dough can be pulled apart using one's hands. As long as the block of dough has an imprint or a partial cut, the dough blocks can be either cut or broken into smaller size pieces of rectangular, circular, triangular, or any other geometric shape. There is no waste due to shaping, and no manipulation is required, other than cutting or breaking of the dough by the consumer, prior to baking. The dough is formulated to flow upon baking and the pieces may be baked on a sheet or pan that allows them to flow to form substantially round baked products if desired. In another embodiment, the pieces are first separated, but are baked in a single pan to facilitate a more uniform baking of the pieces. The block of dough may be frozen or refrigerated prior to use. The imprint preferably extends partially through the dough thickness although in certain situations it can extend throughout the entire thickness. U.S. Pat. No. 6,413,563 has further details regarding preferred imprint configurations.

The dough will typically include a leavening agent, flour, and fat, and in the case of sweet doughs, sugar as well. Other optional ingredients include a texturing agent, and a flavoring agent. The leavening agent is typically present in an amount of about 0.1% to 3% by weight. The flour content of the dough product is about 10% to 60%, preferably about 20% to 40%, and more preferably about 27% to 34% by weight. Sugar or a sugar substitute is typically present in sweet doughs in an amount of about 5% to 50%, preferably about 10% to 40% by weight. In the bakery dough embodiment, the sugar content of the dough is preferably 0.5 weight percent or less, preferably about 0.3 weight percent or less, more preferably about 0.1 weight percent or less. In one bakery dough embodiment, the dough is completely free of sugar. The fat may be of plant or animal origin, such as lard, butter, margarine, or any of various oils, and is typically present in an amount of about 5% to 33% by weight. Preferably, the texturing agent is egg or egg white and when included is present in an amount of about 0.1% to 10%, more preferably about 2% to 5% by weight. The flavoring agent may be natural or artificial and when included is typically present in an amount of about 0.01% to 8%, preferably about 0.1% to 7% by weight. The dough should also have a moisture content of about 2% to 25%, preferably about 8% to 22%, and more preferably about 12% to 16% by weight.

The block of dough will typically have a filling for each piece, the filling being different from the basic dough, i.e., being made from a different material or having a different viscosity. The filling can be either a creamy or a liquid filling, or even pasty in viscosity. The filling can be a sugar-based confection, such as caramel, chocolate, or a liquid filling. The filling can also be a solid filling, such as chocolate, a flavored dough, or another aromatized dough. Other possible fillings may include fruit jams, sugars, puddings, ice cream, soft candy formulations, chewing gum, marshmallow, and the like. For non-sweet doughs, the filling may include cheese, sauces, spices including savory spices, fruits, vegetables, and the like. The filling can also or alternatively include one or more of a vegetable, cheese, sauce, spice, meat, chicken, fish, or the like. These types of fillings could also be used as a topping over the bakery dough product, such as cheese and/or tomato on bruschetta or focaccia bread, although care must be taken so that toppings do not contact the cooking surface and cause unsightly charring or a burned flavor or sensation in the baked dough product. Any of these fillings can be used in combination for a suitable filling, e.g., caramel and chocolate, or sauce and chocolate, and one or more sweet and non-sweet fillings can even be used separately or in combination with each other. The block with filling is produced either by coextrusion, injection, or by placing the filling on a first dough layer and then putting a second dough layer upon the filling and first dough layer, in a manner similar to the way that ravioli is made.

In a preferred embodiment, extrusion is used to provide a filled dough according to the invention. The dough is typically extruded in long sheets. The filling may be extruded in long strands, such that the filling is continuous from piece to piece. This method is the easiest to implement, and is preferred for use with fillings that are generally resistant to flowing during baking. The surrounding doughs are formulated to flow readily during baking, so that the filling is maintained in the center of the final baked cookie. For more fluid fillings, or for fillings that flow readily during baking, however, a different arrangement is used to prevent a loss of filling when the dough is scored or separated and baked. The filling is extruded in discrete pulses so that it would be present only in the center of each piece of the dough product. In this way, the fluid filling is maintained in the center between where the score lines will be for each piece. This has the advantage of keeping the filling within each piece of the dough during baking of the cookies.

The shape of the filling is based on a cross-sectional view of the dough. A round filling has been used, as noted in U.S. Pat. No. 6,280,783. It has now been discovered that improvements can be made to this shape to provide additional dough relative to filling in a vertical direction, i.e., above and below the filling. As a result, the dough surrounding the filling is less subject to being broken to expose or spill the filling. This extra dough compared to filling reduces the possibility of puncturing by the scoring wheels or knives that insert the score lines between the individual cookies, bars, or other dough products, or by the ultrasonic cutters during the coextrusion process. The dough also tends to flow during baking, while the filling does not, so that the additional dough minimizes exposing the filling, which can easily char, harden, stick to the cooking surface, or the like if exposed. Thus, the size, amount of filling (dough to filling ratio), and distance of the filling from the edge of the dough product is important to obtain these advantages.

Many shapes for the filling of the invention are suitable, as long as more dough is present above and/or below the filling than on the sides, i.e., the filling has a shape that is shorter in distance vertically than horizontally. In one preferred embodiment, the filling is centered vertically, such that equal amounts of dough are above and below the filling. In another preferred embodiment, more dough is disposed above the filling than below. These shapes include, but are not limited to, shapes that substantially mimic rectangles, triangles, pentagons, hexagons, half circles, diamonds, trapezoids, ovals, other polygons, and many more, so long as more dough is present above and below the filling than on the sides. When polygon shapes are provided, the edges or corners are preferably rounded. This can occur naturally with soft or creamy fillings as they cannot maintain a perfect polygonal shape when placed in the soft dough. Also, a "perfect shape," i.e., an exact rectangle, can become modified slightly during the processing. For example, passing a second dough sheet on the filling and first dough sheet can distort the "perfect" rectangle into a substantially rectangular shape. Also, equipment, such as a coextruder or injection nozzle, can distort the shapes slightly. All of these minor variations are within the scope of the invention. Moreover, these shapes may partially distort during the baking process due to the flowing of the dough.

The nozzle is preferably designed to provide a shape of the filling that is preferably approximately symmetrical, as this makes it easier for the shape to be repeatable, such as by the extrusion or injection nozzle. Also, having a symmetrical, evenly distributed filling in the center of the dough provides for the maximum amount of dough between the filling and the edges of the dough. This minimizes the difficulties experienced with oozing or dripping of the filling during baking of the dough product. Also, sharp corners or extensions of filling should be avoided as these could help the filling ooze out of the dough.

The filling may also be in two or more separate shapes within the same dough product. This may include two rectangles, two ovals, or a combination of two or more shapes. Again, for rectangles or other polygons, rounded corners, edges, or both are preferred to avoid extrusion difficulties in the corners of the nozzles or other processing equipment. Also, simple designs for the nozzle are preferred compared to more complicated shapes or combinations of shapes, as the latter can make it more difficult to keep the desired dough to filling ratio and the distance of the filling from the edge of the dough product within the range necessary to keep the filling from being exposed or spilling.

Other shapes that may be used include holiday shapes, such as Christmas trees, stars, bells, reindeer, Chanukah menorahs, animated characters, such as rabbit or mouse ears, faces, and the like, and any others that can be devised by those of ordinary skill in the art. The shape of the filling is generally controlled by the processing equipment, such as by the shape of the extrusion or injection nozzle. Furthermore, the filling shape can be dictated by the shape of the dough, again keeping in mind that the a uniform thickness of dough positioned around the filling is preferred to minimize bleed-through of the filling.

While the ratio of dough to filling can normally range from about 30/70 to about 95/5, the ratio is preferably higher for purposes of the present invention. To reduce the likelihood of exposure or spillage of the filling, the ratio of dough to filling will typically range from about 50/50 to about 95/5, more preferably about 70/30 to 95/5, and in a most preferred embodiment, about 80/20 to 95/5.

Typically, the individual piece of dough product will have sufficient dough between the filling and the edge to prevent the filling from being exposed or spilling from the dough piece during processing, separation, and baking. The vertical height of the filling will preferably be about 5% to 90% of horizontal distance. More preferably, the vertical distance will be about 15% to 80% of the horizontal distance. In one preferred embodiment, the vertical distance will be about 25% to 70% of the horizontal distance. In one example, the vertical height of the filling is 83.5% of the horizontal distance.

These ratios and distances will, of course, vary depending on the type and viscosity of the dough, i.e., how much the dough will move during processing and baking. One of ordinary skill in the art would readily recognize the amounts and distances that will be feasible for each type of dough and filling material, particularly with reference to this disclosure.

Optionally, the dough, the filling, or both may contain inclusions. Inclusions include, but are not limited to, chocolate pieces, oat flake pieces, raisins, fruit pieces, whole nuts or nut pieces, e.g., groundnuts, hazelnuts, or other nuts, caramel, candy pieces, or various mixtures thereof. In one preferred embodiment, the filling is substantially or completely free of inclusions. The inclusions can be of any edible size, and are typically about 1 mm to about 25 mm, preferably about 4 mm to about 10 mm in diameter. The amount of inclusions is not critical and can vary from about 1% to 30% by weight. Optionally, dark chocolate, milk chocolate, white chocolate, compound coatings, or mixtures thereof, may be used in the form of morsels, pellets, or chunks. Typically, chocolate is present in an amount of about 5% to about 50%, preferably about 10% to about 30% by weight. The chocolate can be a commercial chocolate or a chocolate of the type used in pastry making or in catering. Preferably, the inclusions are sufficiently small that they do not damage or cause breakage or penetration through the dough shell that surrounds the filling. In another embodiment, the filling can be substantially free or even completely free of added sugar. In one preferred embodiment, the added sugar content in the filling is less than 0.5 weight percent, while in another the added sugar in the filling is less than about 0.25 weight percent of the filling.

According to one embodiment of the invention, the block or sheet of dough is sufficiently thick to form a cookie or other sweet dough or bakery dough product of edible size upon baking. This feature avoids the need for further dough manipulation either by rolling or folding the dough. Typically, the sweet dough or bakery dough sheet has a thickness of about 0.5 cm to about 5 cm, preferably about 1 cm to about 3 cm.

The block or sheet of dough is generally cut or broken into smaller pieces prior to baking. Multiple pieces may be provided together, such as a section that is 4 pieces by 4 pieces, or 2 pieces by 4 pieces, or 2 pieces by 2 pieces, or other combinations. Each piece would thus contain its own filling. The filling may be a continuous strand between pieces, or each piece may be filled in discrete pulses, as detailed above.

Preferably, the block of dough is precut into parallelepipedal blocks about 1 cm to 5 cm, preferably about 3 cm to 4 cm in size, with a thickness of about 1 cm to 5 cm, preferably about 1 cm to 3 cm. If the dough is shaped into a disk or cylinder, the cylinder typically has a diameter of about 2 cm to 8 cm, preferably about 3 cm to 6 cm, and a thickness of about 1 cm to 5 cm, preferably about 1 cm to 3 cm. If the block is shaped into a prismatic block, typically, the prismatic block has a thickness of about 1 cm to 3 cm, and a triangle with sides measuring about 2 cm to 8 cm, preferably about 3 cm to 6 cm.

In another embodiment of the invention, the dough product is in the form of a sheet or block with at least two layers. The dough product may also be present in at least two different strips from each piece taken from the block. Stamping or decorations may be present on the top of each piece. The pieces may also have different colors and two different color doughs may be swirled together to provide a marbled appearance. The dough product may be precut into different sizes. A variety of sizes and shapes of dough product may be envisioned by those of ordinary skill in the art, all of which are included in the scope of the invention.

Referring now to the drawings, as used therein, the opening to extrude the dough 12 surrounds the opening to extrude the filling 14 to form the shape 16 of the filling. FIG. 1 shows the injection nozzle used to produce a circle-shaped filling of the prior art. This shape does not produce a filling that is shorter in shape vertically between the top and bottom than horizontally between the sides and experiences the most problems with filling spillage, as described above. FIGS. 2–13 show examples of injection nozzles to prepare different embodiments of the invention, showing the shapes 16 to be shorter in distance vertically than horizontally. FIG. 14 shows a dough product with a substantially triangle-shaped filling according to the present invention.

Figure 2:
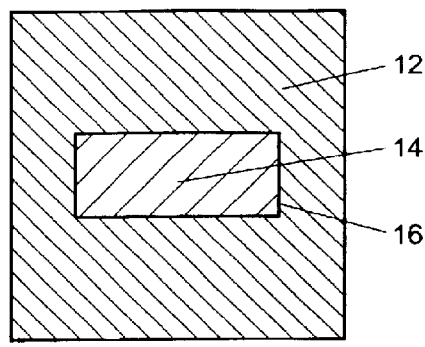
FIG. 2 shows a cross-sectional view of a nozzle used to form a substantially rectangular-shaped filling according to the invention.

FIG. 2 shows a nozzle with a rectangular-shaped opening. The shape 16 of the opening to extrude the filling 14 is sized and configured to have a shape shorter in distance vertically between the bottom and the top than horizontally between the sides. The shape 16 does not have a high center. This avoids incorrect breaking of the pieces, keeps the filling from coming out of the top center during baking, and prevents the score lines from penetrating to the filling 14.

Figure 3:
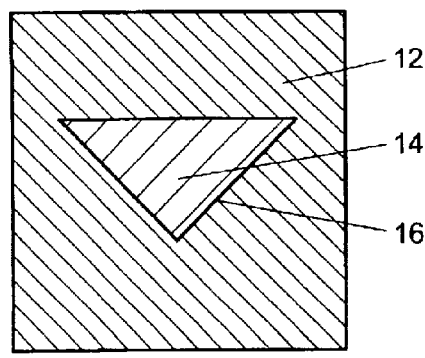
FIG. 3 shows a cross-sectional view of a nozzle used to form a substantially triangular-shaped filling according to the invention.

FIG. 3 shows a nozzle with a triangular-shaped opening. The shape 16 of the opening to extrude the filling 14 is sized and configured to have a shape shorter in distance vertically between the bottom and the top than horizontally between the sides. This shape 16 has a smaller area than the circle of FIG. 1. Some increase in the height in the center of the nozzle is permitted, but the overall filling has much less volume due to the smaller area of a triangle compared to the circle of FIG. 1. For certain doughs, this shape 16 is disadvantageous because it has acute angles at two corners of the triangle, and the dough has a tendency to build up in these areas making the nozzle difficult to clean. Rounding the corners of nozzles that have such acute angles resolves this problem, resulting in a filling having the shape of FIG. 14. Also, increasing the size of the angle corrects this problem. The angle of the lower point of the triangle should be obtuse in order for the shape 16 to be shorter vertically than horizontally.

Figure 4:
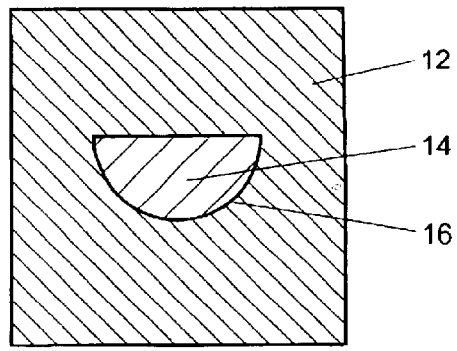
FIG. 4 shows a cross-sectional view of a nozzle used to form a substantially pentagon-shaped filling according to the invention.

FIG. 4 shows a nozzle with a half circle-shaped opening. The flat upper surface provides a sufficient dough covering to avoid bleeding of the filling. This shape 16 is similar to FIG. 3, only the bottom point is now rounded.

Figure 5:
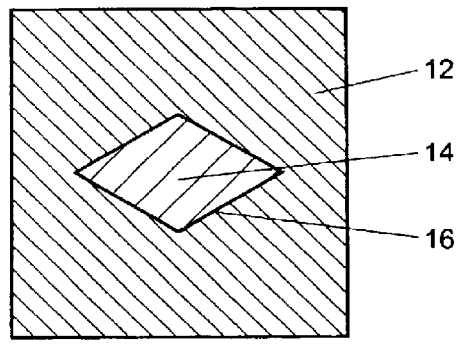
FIG. 5 shows a cross-sectional view of a nozzle used to form a substantially hexagon-shaped filling according to the invention.

FIG. 5 shows a nozzle with a diamond-shaped opening. This shape 16 is similar to FIG. 3 in that the top now comes to a point as well. Both the top and bottom angles must be obtuse, so that the shape 16 is shorter vertically than horizontally. Again, the volume is smaller than that of a circle (or cylinder).

Figure 6:
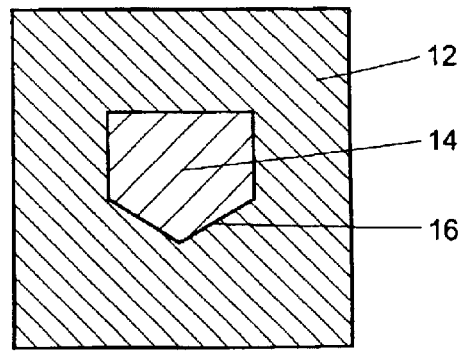
FIG. 6 shows a cross-sectional view of a nozzle used to form a substantially half circle-shaped filling according to the invention.

FIG. 6 shows a nozzle with a pentagon-shaped opening. The shape 16 of the opening to extrude the filling 14 is also sized and configured to have a shape shorter in distance vertically between the bottom and the top than horizontally between the sides. This shape is a combination of FIGS. 2 and 3. This shape 16 is also not symmetrical between the bottom and the top making repeatability slightly more difficult.

Figure 7:
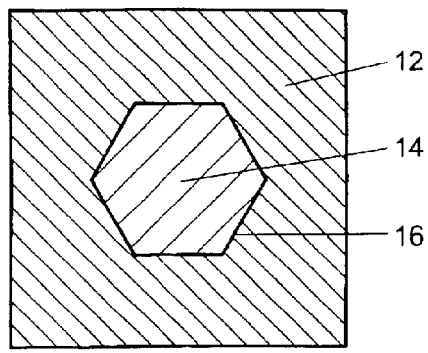
FIG. 7 shows a cross-sectional view of a nozzle used to form a substantially diamond-shaped filling according to the invention.

FIG. 7 shows a nozzle with a hexagon-shaped opening. The shape 16 of the opening to extrude the filling 14 is sized and configured to have a shape shorter in distance vertically between the bottom and the top than horizontally between the sides. The top and bottom sides of the hexagon should be larger in length than the others to get the desired configuration of shorter in distance vertically than horizontally. Although this shape and other polygons with obtuse angles appear similar to circles, the polygons have the advantage of having less area, and thus less filling than the circle. This reduces the likelihood of filling spillage, since less filling is present. Also, the flat top surface enables maintenance of a minimum dough thickness above the filling.

Figure 8:
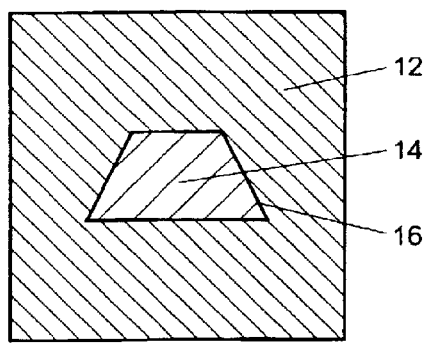
FIG. 8 shows a cross-sectional view of a nozzle used to form a substantially trapezoid-shaped filling according to the invention.

FIG. 8 shows a nozzle with a trapezoid-shaped opening. The shape 16 of the opening to extrude the filling 14 is sized and configured to have a shape shorter in distance vertically between the bottom and the top than horizontally between the sides. The lower corners of the nozzle may be rounded to avoid buildup of filling in those corners. The bottom of the trapezoid should be wider than the top to allow for additional filling to be provided.

Figure 9:
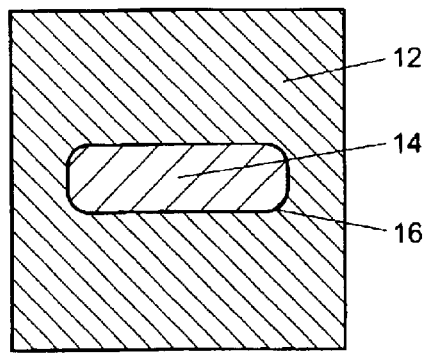
FIG. 9 shows a cross-sectional view of a nozzle used to form a substantially oval-shaped filling according to the invention.

FIG. 9 shows a nozzle with an oval-shaped opening. This shape 16 is advantageous in that it has no corners at all and can be considered in general as a rounded rectangle.

Figure 10:
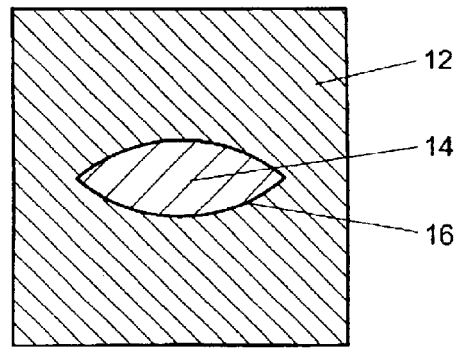
FIG. 10 shows a cross-sectional view of a nozzle used to form a substantially almond-shaped filling according to the invention.

FIG. 10 shows a nozzle with an almond-shaped opening. This shape 16 has a slightly smaller area than the oval shown in FIG. 9. The advantage of this is that less filling is present, thus reducing the chance of filling spillage.

Figure 11:
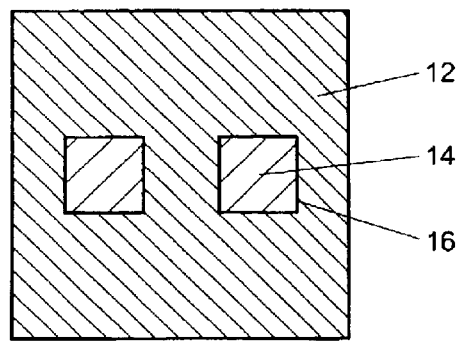
FIG. 11 shows a cross-sectional view of a nozzle used to form two substantially rectangular-shaped fillings according to the invention.

FIG. 11 shows a nozzle with dual rectangle-shaped openings. The shape 16 of the opening to extrude the filling 14 is sized and configured to have a shape shorter in distance vertically between the bottom and the top than horizontally between the sides. Any of the shapes shown in the other figures may be combined to have two fillings present in a single dough product. In fact, even two circular fillings can be used, as dual smaller fillings and more surrounding dough are provided. There is less concern of bleeding of the filling during baking of the cookies.

Figure 12:
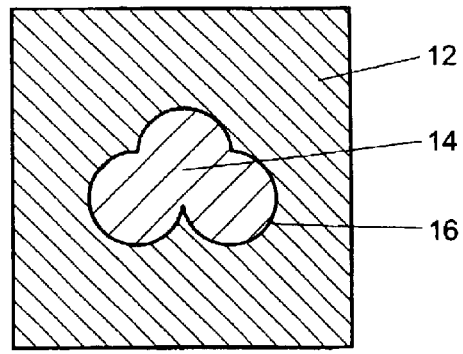
FIG. 12 shows a cross-sectional view of a nozzle used to form a substantially mouse ears-shaped filling according to the invention.

FIG. 12 shows a nozzle with a mouse ears-shaped opening. The shape 16 also provides more filling near the bottom of the cookie.

Figure 13:
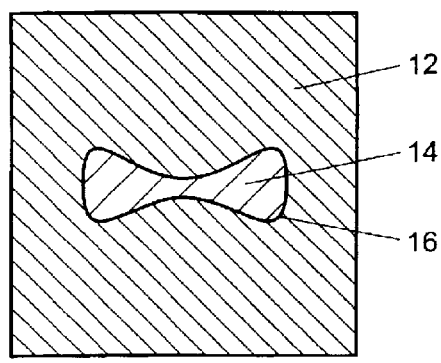
FIG. 13 shows a cross-sectional view of a nozzle used to form a substantially peanut-shaped filling according to the invention.
Figure 14:
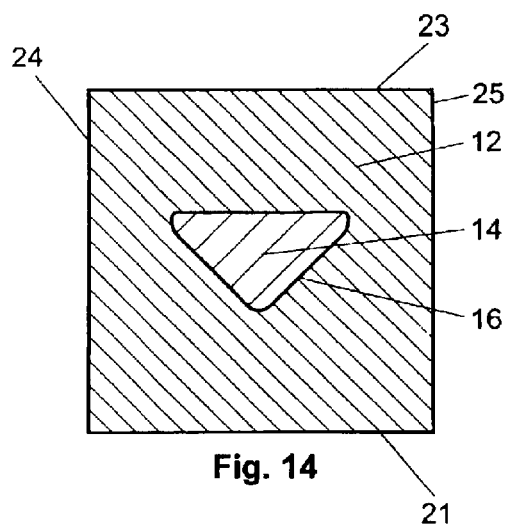
FIG. 14 shows a cross-sectional view of a dough product having a substantially triangle-shaped filling according to the present invention.

FIG. 13 shows a nozzle with a peanut-shaped opening. The shape 16 of the opening to extrude the filling 14 is sized and configured to have a shape shorter in distance vertically between the bottom and the top than horizontally between the sides. This shape 16 allows for more dough to be present in the center of the dough product. When the dough flows from the center upon baking, there will still be additional dough available for surrounding the filling.

FIG. 14 shows a dough product with a substantially triangular-shaped filling. The corners are slightly rounded and the shape has flattened slightly due to the extrusion process. The shape of the filling is sized and configured to have a shape shorter in distance vertically between the bottom 21 and the top 23 than horizontally between the sides 24, 25. This dough product could be made with a rounded corner triangle. Any of the nozzles with sharp or angled corners could be rounded to avoid buildup of dough in these corners.

The term "about," as used herein, should generally be understood to refer to both numbers in a range of numerals. Moreover, all numerical ranges herein should be understood to include each whole integer within the range.

The term "substantially," as used herein to refer to values, generally refers to at least about 90 percent, preferably about 95 percent, of the value. In a preferred embodiment, it refers to at least about 98 percent. For example, when the dough product is substantially free from inclusions, this means that it contains less than 10%, and preferably less than 5%, and more preferably less than 2% inclusions. The term "substantially," as used herein to refer to shapes, indicates that the shape is at least similar to a stated shape, but is not exactly the recited shape. For example, when a shape is substantially triangular, the corners may be rounded or the shape may be slightly flattened. Thus, the shape at least resembles the indicated shape, here a triangle, but is not necessarily exactly the indicated shape.

It is to be understood that the invention is not to be limited to the exact configuration as illustrated and described herein. Accordingly, all expedient modifications readily attainable by one of ordinary skill in the art from the disclosure set forth herein, or by routine experimentation therefrom, are deemed to be within the spirit and scope of the invention as defined by the appended claims.

What is claimed is:

1. A ready-for-use dough product comprising a liquid, creamy, or pasty filling and dough surrounding the filling, the dough having a top portion, a bottom portion, and side portions, with the filling being readily flowable at a baking temperature and not flowable under refrigerated or frozen conditions, and being arranged to minimize oozing or dripping thereof out of the surrounding dough at the baking temperature by being sized and configured to have a shape that is shorter in distance vertically from the bottom portion to the top portion than horizontally between the side portions, when the dough is viewed in cross-section wherein said dough product is a bakery dough to form one or more of muffins, crackers, rolls, biscuits, pie crust, breads, pizza doughs or bagels.

2. The dough product of claim 1, wherein the dough to filling has a weight ratio of about 50/50 to 95/5.

3. The dough product of claim 1, wherein the shape of the filling is at least substantially in the form of a rectangle, triangle, pentagon, hexagon, half circle, diamond, trapezoid, or oval.

4. The dough product of claim 1, wherein the vertical distance is about 5% to 90% of the horizontal distance.

5. The dough product of claim 1, in sheet or block form having a generally uniform thickness wherein the top portion has a surface that includes an imprint of grooves, score lines, or combinations thereof, that defines pieces of the dough to be broken off and baked, with the imprint extending into the thickness of the dough and each dough piece contains a filling which is surrounded above, below, and on two sides by dough.

6. The dough product of claim 5, wherein the imprint does not extend entirely through the thickness of the dough.

7. The dough product of claim 5, in the form of a parallelepipedal or prismatic block having a thickness of about 0.5 to 5 cm, wherein a plurality of fillings are provided, with each filling having the recited shape and being spaced from adjacent fillings.

8. The dough product of claim 7, in the form of a flat sheet having a thickness of about 1 cm to 3 cm and the fillings are provided as a plurality of spaced stripes in the dough.

9. The dough product of claim 1, wherein the dough comprises less than 0.5 weight percent sugar.

10. The dough product of claim 1, wherein the dough comprises a texturing agent comprises egg or egg white present in an amount of about 0.1% to 10% by weight, a flavoring agent present in an amount of about 0.1% to 7% by weight, a fat which is a solid, semi-solid, or liquid at room temperature and of animal or plant origin, and the dough has a moisture content of about 2% to about 25%.

11. The dough product of claim 9, in the form of a block having at least one of: at least two different dough layers, at least two different dough strips, at least some of the pieces have different colors, at least some of the pieces have surface decorations, or at least two different doughs swirled together.

12. The dough product of claim 1, wherein the product is stored in a refrigerated or frozen state prior to use and the filling comprises cheese, sauce, spices, fruit, vegetable, meat, chicken, fish, or any combination thereof.

13. A method for providing a filled dough product which comprises: providing a liquid, creamy, or pasty filling that is readily flowable at a baking temperature and not flowable under refrigerated or frozen conditions, disposed within a dough having a top portion, a bottom portion, and side portions with the filling being arranged to minimize oozing or dripping thereof out of the dough at the baking temperature by being sized and configured to have a shape that is shorter in distance vertically from the bottom portion to the top portion than horizontally between the side portions when the dough is viewed in cross-section to provide the filled dough product wherein said filled dough product is a bakery dough to form one or more of muffins, crackers, rolls, biscuits, pie crust, breads, pizza doughs or bagels.

14. The method of claim 13, further wherein the filled dough product is prepared by coextruding the dough and the filling through a filling-shaped nozzle that provides the shaped filling sized to have the distance shorter vertically than horizontally such that the dough surrounds the filling.

15. The method of claim 14, further comprising coextruding the dough in the form of a parallelepipedal or prismatic block having a thickness of about 0.5 to 5 cm and providing a plurality of fillings therein, with each filling having a first desired shape and being spaced from adjacent fillings.

16. The method of claim 15, wherein the dough block is coextruded as a pair of flat sheets having a thickness of about 1 to 3 cm and the fillings are provided as a plurality of spaced swipes which are extruded between the dough sheets.

17. The method of claim 15, wherein the dough is formulated to flow upon baking and the sheet is cut into pieces that are baked on a sheet or pan that allows the pieces to flow to form individually baked products having a second desired shape.

18. The method of claim 13, wherein the dough is coextruded in the form of a block having at least two different dough layers, at least two different dough strips, at least some of the pieces have different colors, at least some of the pieces have surface decorations, or at least two different doughs are swirled together.

19. The method of claim 13, wherein the filling is provided in discrete pulses, such that when the dough is cut into pieces, the fillings are contained within each piece and do not cross into adjacent pieces.

20. The method of claim 15, wherein the dough is coextruded in sheet or block form having a generally uniform thickness wherein the top portion has a surface that includes an imprint of grooves, score lines, or combinations thereof, that defines pieces of the dough to be broken off and baked, with the imprint extending into the thickness of the dough.

21. The method of claim 20, wherein the dough is stored in a refrigerated or frozen state prior to use and the imprint does not extend entirely through the thickness of the dough.

* * * * *

UNITED STATES PATENT AND TRADEMARK OFFICE
CERTIFICATE OF CORRECTION

PATENT NO. : 6,790,467 B2 Page 1 of 1
DATED : September 14, 2004
INVENTOR(S) : Kostival et al.

It is certified that error appears in the above-identified patent and that said Letters Patent is hereby corrected as shown below:

Column 12,
Line 27, after "spaced", delete "swipes" and insert -- stripes --.

Signed and Sealed this

Fourteenth Day of December, 2004

JON W. DUDAS
*Director of the United States Patent and Trademark Office*